US010785528B2

(12) United States Patent
Liu (10) Patent No.: US 10,785,528 B2
(45) Date of Patent: Sep. 22, 2020

(54) METHOD, DEVICE AND SYSTEM FOR ACCESS CONTROL FOR WIRELESS STREAMING OF AUDIO-VISUAL DATA

(71) Applicant: Xing Liu, Lund (SE)

(72) Inventor: Xing Liu, Lund (SE)

(73) Assignee: Xing Lin, Lund (SE)

( * ) Notice: Subject to any disclaimer, the term of this patent is extended or adjusted under 35 U.S.C. 154(b) by 162 days.

(21) Appl. No.: 16/067,623

(22) PCT Filed: Dec. 22, 2016

(86) PCT No.: PCT/SE2016/000076
§ 371 (c)(1),
(2) Date: Jul. 2, 2018

(87) PCT Pub. No.: WO2017/123123
PCT Pub. Date: Jul. 20, 2017

(65) Prior Publication Data
US 2019/0014375 A1    Jan. 10, 2019

(30) Foreign Application Priority Data
Jan. 11, 2016  (SE) ........................ 1630006

(51) Int. Cl.
*H04L 29/06* (2006.01)
*H04N 21/41* (2011.01)
(Continued)

(52) U.S. Cl.
CPC ....... *H04N 21/4367* (2013.01); *G06F 3/1454* (2013.01); *H04L 29/06027* (2013.01);
(Continued)

(58) Field of Classification Search
CPC ............ H04N 21/4367; H04N 21/441; H04N 21/43637; H04N 21/43615;
(Continued)

(56) References Cited

U.S. PATENT DOCUMENTS

| 9,451,391 | B1 * | 9/2016 | Brenner | ............... H04W 40/246 |
| 9,659,296 | B2 * | 5/2017 | Patel | ....................... G06Q 20/40 |
| 2016/0142865 | A1 * | 5/2016 | Park | ........................ H04W 4/80 |
| | | | | 455/41.1 |

FOREIGN PATENT DOCUMENTS

WO    WO-2014204272 A1 * 12/2014    ............... H04W 4/80

* cited by examiner

*Primary Examiner* — Benjamin R Bruckart
*Assistant Examiner* — Tien M Nguyen (57) ABSTRACT

Method, device and system for access control for wireless streaming of audio-visual data to a receiver device, it comprising the steps of: wirelessly connecting the receiver device to a plurality of sender devices positioned in an area, transmitting, by the receiver device, a privilege signal pertaining to a sender device to obtain a privileged status, the privilege signal having spatial coverage within the area, extracting, by at least one of sender devices, privilege credentials from the privilege signal, and transmitting the privilege credentials from the at least one sender device to the receiver device to acquire privileged status, controlling, by a sender device having a privilege status, access of wireless data streaming from any other sender devices to the receiver device. The method, device and system can be advantageous as it differentiates users and permits privileged sender device to control wireless streaming of audio-visual data from other sender devices to the receiver device.

18 Claims, 5 Drawing Sheets

(51) Int. Cl.
| | |
|---|---|
| H04N 21/4363 | (2011.01) |
| H04W 88/02 | (2009.01) |
| H04N 21/414 | (2011.01) |
| H04N 21/4367 | (2011.01) |
| H04L 29/08 | (2006.01) |
| H04W 12/00 | (2009.01) |
| H04N 21/436 | (2011.01) |
| G06F 3/14 | (2006.01) |
| H04N 21/441 | (2011.01) |
| H04W 12/08 | (2009.01) |
| H04W 76/11 | (2018.01) |
| H04W 76/10 | (2018.01) |
| H04W 84/18 | (2009.01) |
| H04W 4/021 | (2018.01) |
| H04W 84/12 | (2009.01) |
| H04W 4/80 | (2018.01) |
| H04W 28/02 | (2009.01) |
| H04W 76/14 | (2018.01) |
| H04W 12/06 | (2009.01) |

(52) U.S. Cl.
CPC ........ H04L 63/0876 (2013.01); H04L 63/107 (2013.01); H04L 65/4084 (2013.01); H04L 65/4092 (2013.01); H04L 65/602 (2013.01); H04L 67/125 (2013.01); H04L 67/148 (2013.01); H04N 21/4122 (2013.01); H04N 21/41415 (2013.01); H04N 21/43615 (2013.01); H04N 21/43637 (2013.01); H04N 21/441 (2013.01); H04W 12/003 (2019.01); H04W 12/00504 (2019.01); H04W 12/08 (2013.01); H04W 76/11 (2018.02); H04W 88/02 (2013.01); G09G 2358/00 (2013.01); G09G 2370/16 (2013.01); H04W 4/021 (2013.01); H04W 4/80 (2018.02); H04W 12/06 (2013.01); H04W 28/02 (2013.01); H04W 76/10 (2018.02); H04W 76/14 (2018.02); H04W 84/12 (2013.01); H04W 84/18 (2013.01)

(58) Field of Classification Search
CPC ........ H04N 21/4122; H04N 21/41415; H04W 88/02; H04W 12/003; H04W 12/00504; H04W 76/11; H04W 12/08; H04W 28/02; H04W 4/80; H04W 84/12; H04W 4/021; H04W 84/18; H04W 12/06; H04W 76/14; H04W 76/10; H04W 72/04; G06F 3/1454; H04L 29/06027; H04L 67/125; H04L 65/4084; H04L 65/602; H04L 67/148; H04L 65/4092; H04L 63/107; H04L 63/0876; G09G 2358/00; G09G 2370/16

See application file for complete search history.

METHOD, DEVICE AND SYSTEM FOR ACCESS CONTROL FOR WIRELESS STREAMING OF AUDIO-VISUAL DATA

FIELD OF THE DISCLOSURE

The present disclosure relates generally to wireless streaming of audio-visual data on an external display or projector, and more particularly to a method for access control to a receiver device adapted to receive the streaming audiovisual data.

BACKGROUND

Intel® WiDi, Miracast, Apple® Airplay and Google® Cast are all technologies which allow wireless streaming between devices of audio, video, device screens, and photos, without the need of cables. WiDi, with the full name as Intel Wireless Display, is a proprietary specification developed by Intel; Miracast is released by WiFi Alliance for their own WiFi Display (WFD) technology basing on WiDi. Since Intel Wireless Display version 3.5, the Miracast standard was supported; AirPlay is developed by Apple, and Google Cast is developed by Google. Apple AirPlay and Google Cast are neither compatible to each other nor to WiDi/Miracast.

Figure 1:
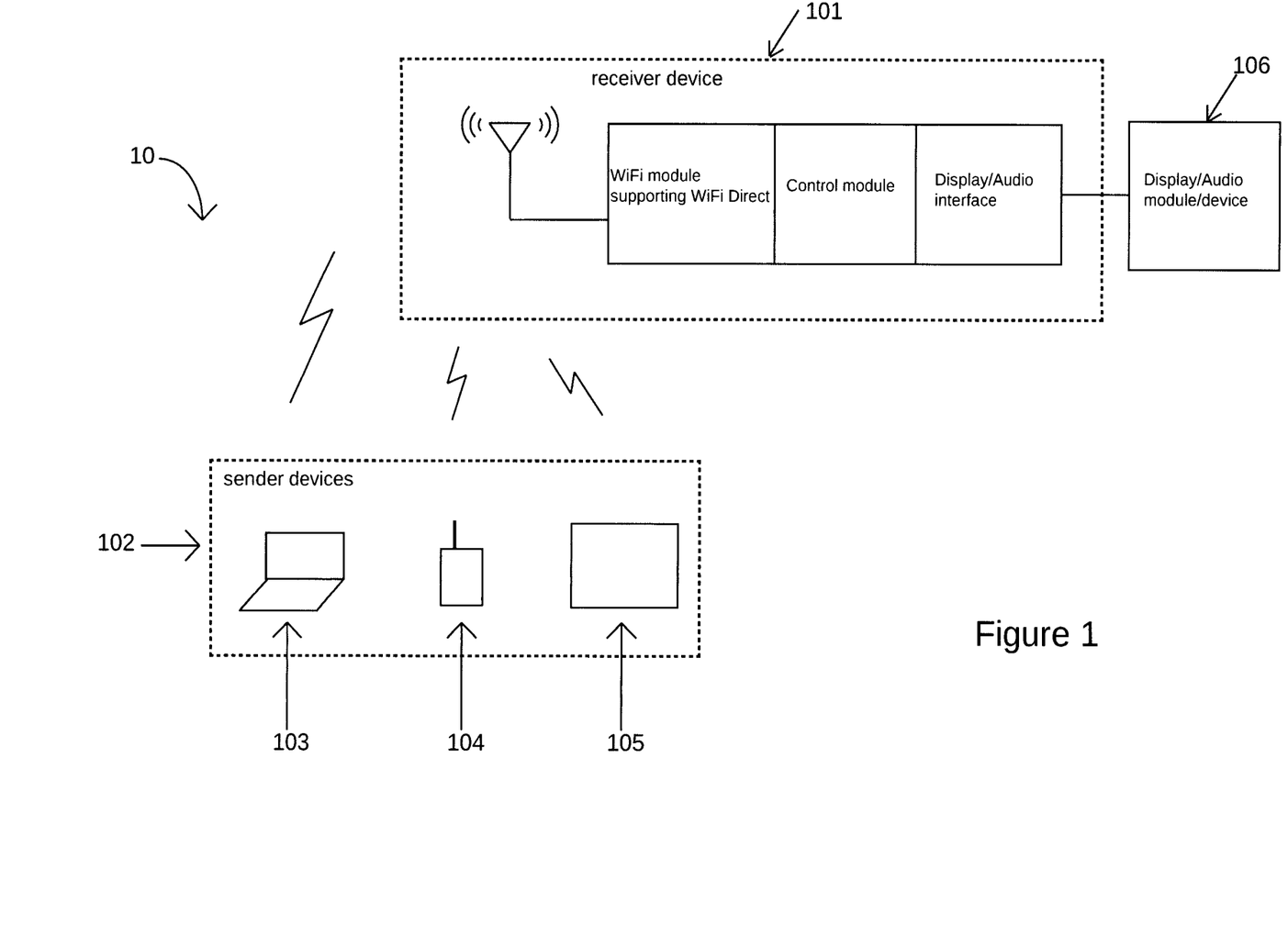
FIG. 1 is a schematic block diagram of a WiDi/Miracast system, including a number of sender devices and a WiDi/Miracast receiver device.
Figure 2:
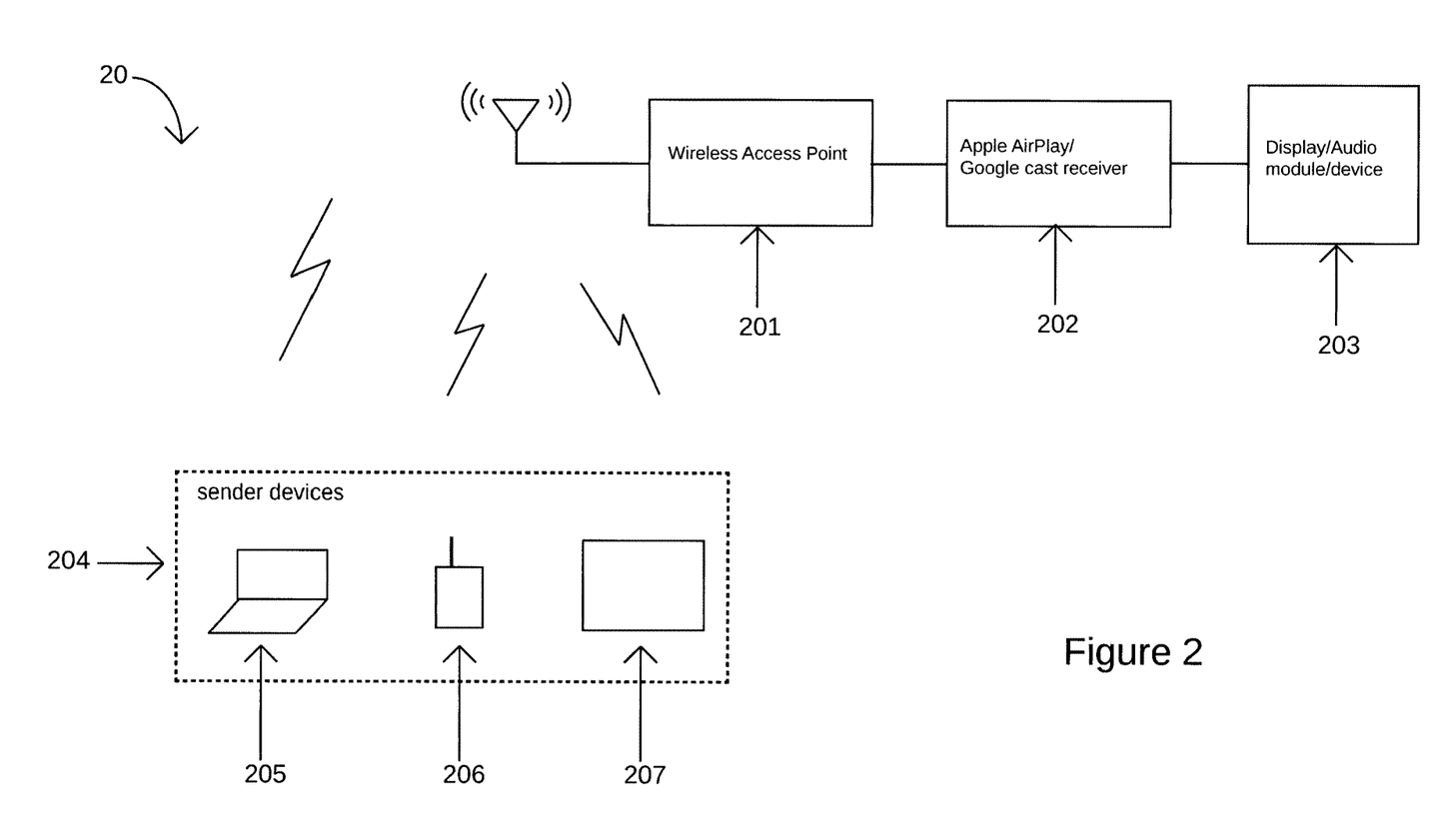
FIG. 2 is a schematic block diagram of an Apple AirPlay/Google Cast system, including a number of sender devices and an Apple AirPlay/Google Cast receiver device.

The technologies will now be discussed with reference to FIGS. 1 and 2. FIG. 1 shows schematically the WiDi/Miracast technology. A sender device 103,104,105,205,206, 207 (called "source device" in the WiDi/Miracast technology) provides content which is streamed, via a wireless link, at a receiver device 101,202 (called "sink device" in the WiDi/Miracast technology). In Apple AirPlay and Google Cast, apart from the sender device 205,206,207 and the receiver device 202, a Wireless Access Point 201 is also needed to be able to stream the content from the sender device 205,206,207 wirelessly.

The receiver device 101,202 could include an internal display/audio module 106,203, or connect to an external display/audio device such as e.g. a projector or TV 106,203. By using the technology of WiDi/Miracast/Apple AirPlay/Google cast, the sender device (e.g., a computer 103, 205, phone 104,206, Pad 105,207 etc.) can take advantage of better display capabilities of a receiver device (e.g., a digital television, audio/video receiver, etc.), or the better display capabilities of the external display (e.g. projector, a digital television, audio/video receiver, etc) that a receiver connecting with to display content that is initially stored in, or streamed from, the sender device.

In WiDi/Miracast, the receiver device could either be accessed directly by the sender device after having discovered the receiver device, or after an additional verification by a user inputting a correct PIN code showing on a display integral with, or connected to, the receiver device. In Air-Play/Google cast, the sender device which joins the same network where an AirPlay/Google cast receiver device exists can send content for displaying. In other word, it uses the network for access control.

In WiDi/Miracast/Apple AirPlay/Google Cast, the sender devices are equal to each other and execute the same options. Thus, no sender device has privilege over other sender devices. One sender device can connect to the receiver device when there is no ongoing WiDi/Miracast connection. This WiDi/Miracast connection cannot be interrupted by any other sender device. For Apple AirPlay/Google Cast, the ongoing connection could be interrupted by a request from any other sender device.

The access control approach outlined above is often sufficient when there are a limited number of sender/receiver devices coexisting in the neighbourhood, such as in a home environment, and where there is no need to have discrimination among the sender devices. However, in the area where many receiver devices coexist, such as schools where receiver devices are equipped in classrooms, the neighbourhood wireless signals may overlap in the classroom. The user of a sender device may have to select from a list of discovered WiDi/Miracast receivers for displaying the content. Thus there is a risk of the user selecting the wrong receiver device accidentally. If the user intends to show sensitive content and the selected receiver device does not have a request for PIN code, the sensitive content from the user's sender device may be exposed to people for which the content is not intended for. Another potentially unwanted situation is if a user outside of a room sends unwanted content to a receiver device in the room. The request for a PIN code at the receiver device side can mitigate these problems, but it is many times not sufficient as the PIN code may be easily acquired. The PIN code is visibly shown on the display so it is easy to get. For Apple AirPlay/Google Cast, which requires its own network to operate, the access control will be even more challenging. If all devices are connected to the same network, then the users may have a long list of receiver devices to select from, and there are no means of configuring the receiver device not to show content from a sender device which is outside of the classroom.

As, for WiDi/Miracast/Apple AirPlay/Google cast, the sender devices are equal to each other, none has privilege than others. Thus there is a risk of people interrupting each other's presentations, such as e.g. a teacher who is showing something on the display is interrupted by a student in AirPlay/Google cast. Another example can be when a teacher wants to interrupt the current ongoing connection proceeding by student in WiDi/Miracast. To mitigate this problem, Intel has introduced Intel® Pro Wireless Display to add user/client (sender devices) management capability to WiDi. The first client (sender device) connecting to the receiver device is identified as meeting owner which has privilege to manage the WiDi connection from other clients. A particular problem with this technology is that it relies on the first client connecting to the receiver device being the one that should have the privilege to control it, a definition of the privileged client that is quite easy to misuse.

SUMMARY

It is an object of the present invention to mitigate the above mentioned problem, and to provide a method that makes it convenient for users to display the content from their sender device (such as for example their mobile phone/pad/personal computer etc.) at the expected projector or other display devices, in a secure and convenient way. The users may be for examples, students and teachers in a classroom at a school, or meeting participants and moderators in a meeting room in an office building, situations where many receiver devices may coexist and the teacher or moderator expects to control the wireless data streaming session from the other sender devices.

This and other problems are solved by providing a method for access control of wireless data streaming to a receiver device, wherein only sender devices located in a specific region of a room is allowed to control access of streaming data to said receiver device.

According to a first aspect of the invention, a method for access control of wireless data streaming to a receiver device is provided. The method comprises a number of steps, where the first step is to wirelessly connect the receiving device to a plurality of sender devices positioned in an area, wherein the positions of the plurality of sender devices has a first spatial coverage in the area. The next step is transmitting, by the receiver device, a privilege signal pertaining to a sender device to obtain a privileged status, the privilege signal having a second spatial coverage in the area. The third step is extracting, by at least one of the plurality of sender devices, privilege credentials from the privilege signal, and transmitting the privilege credentials from the at least one sender device of said plurality of sender devices to the receiver device via the wireless connection to acquire privilege status of the sender device. The forth step is controlling, by a sender device having a privilege status, access of wireless data streaming from any of the plurality of sender devices to the receiver device. The first spatial coverage in the area is larger than the second spatial coverage in the area, wherein the first spatial coverage is overlapping the second spatial coverage. A sender device having received the privilege signal will be a privileged sender device and a sender device having not received the privilege signal will be an unprivileged sender device.

The method can be advantageous as it permits sender devices located in a localized region of a room to be regarded as privileged senders over other sender devices not being located in the same region, these privileged senders are being allowed to control the streaming of data to the receiver device.

According to one embodiment of the invention, the first step comprises: transmitting, by the receiver device, a setup signal pertaining to a sender device to connect to the receiver device, the setup signal having at least the first spatial coverage in the area. The first step further comprises extracting, by the plurality of sender devices, setup credentials from the setup signal, the setup credentials being used by each of the plurality of sender devices to establish the wireless connection to the receiver device.

According to one embodiment of the invention, the wireless data streaming is intended for audiovisual purposes using at least one from the list of: Intel® WiDi, Miracast, Apple® Airplay, Google® Cast.

According to one embodiment of the invention, the privilege signal is a first Bluetooth signal.

According to one embodiment of the invention, the setup signal is a second Bluetooth signal.

According to one embodiment of the invention, the first and second Bluetooth signal uses one from the list of: Bluetooth device name, Bluetooth low energy advertising channel.

According to one embodiment of the invention, the wireless data streaming to the receiver device from a sender device is realised using at least one WiFi module, said at least one WiFi module being arranged to operate in one from the list of: Wireless Access Point mode, WiFi Direct mode.

According to one embodiment of the invention, the setup credentials comprises a service set identifier (SSID) and access password, wherein the setup credentials are used to obtain access to the receiver device via a wireless access point.

According to one embodiment of the invention, the service set identifier (SSID) and/or access password of the wireless access point is changed for a subsequent setup signal.

According to one embodiment of the invention, the privilege credentials are changed for a subsequent privilege message.

According to one embodiment of the invention, any privileged sender device performs one or more from: allowing any unprivileged sender device to stream data to the receiver device, disallowing any unprivileged sender device to stream data to the receiver device, interrupt ongoing data streaming from any unprivileged sender device to the receiver device.

According to a second aspect of the invention, a computer program product is provided, comprising a computer-readable storage medium with instructions adapted to carry out at least parts of the method of any one of claims 1-11 when executed by a device having processing capability.

According to a third aspect of the invention, a receiver device is provided, the receiver device being wirelessly connected to a plurality of sender devices positioned in an area, wherein the positions of the plurality of sender devices have a first spatial coverage in the area. The receiver device comprises: a transmitter unit arranged to wirelessly transmit a privilege signal pertaining to a sender device to obtain a privileged status, the privilege signal having a second spatial coverage in the area. The receiver device further comprises: at least one wireless circuitry arranged to establish connection with sender devices for streaming wireless data to the receiving device. The first spatial coverage in the area is larger than the second spatial coverage in the area, and the first spatial coverage is overlapping the second spatial coverage. A sender device having received the privilege signal will be a privileged sender device and a sender device having not received the privilege signal will be an unprivileged sender device. The receiver device is arranged to allow any privileged sender device to control access of wireless data streaming from any unprivileged sender device to the receiver device.

According to one embodiment of the invention, the receiver device further comprises: a second transmitter unit being arranged to wirelessly transmit a setup signal pertaining to a sender device to connect to the receiver device, the setup signal having at least the first spatial coverage.

According to a forth aspect of the invention, a system is provided comprising a receiver device and a plurality of sender devices. The receiver device is arranged for: wirelessly connecting the receiving device to a plurality of sender devices positioned in an area, wherein the positions of the plurality of sender devices have a first spatial coverage in the area. The receiver device is further arranged to transmit a privilege signal pertaining to a sender device to obtain a privileged status, the privilege signal having a second spatial coverage in the area. Each of the plurality of sender devices is arranged for: extracting privilege credentials from the privilege signal, and transmitting the privilege credentials from each sender device of said plurality of sender devices to the receiver device via the wireless connection to acquire privilege status of the sender device. Each of the plurality of privileged sender devices is further arranged for controlling access of wireless data streaming from any of the plurality of unprivileged sender devices to the receiver device, wherein the first spatial coverage in the area is larger than the second spatial coverage in the area, wherein the first spatial coverage is overlapping the second spatial coverage.

The second, third and forth aspect may generally have the same features and advantages as the first aspect.

Further possible features and benefits of this solution will become apparent from the detailed description below. Please note that any aspect or part of aspect as well as any method or part of method could be combined in any way.

BRIEF DESCRIPTIONS OF DRAWINGS

Examples of embodiments herein are described in more detail with reference to attached drawings in which.

DETAILED DESCRIPTION

Figure 3:
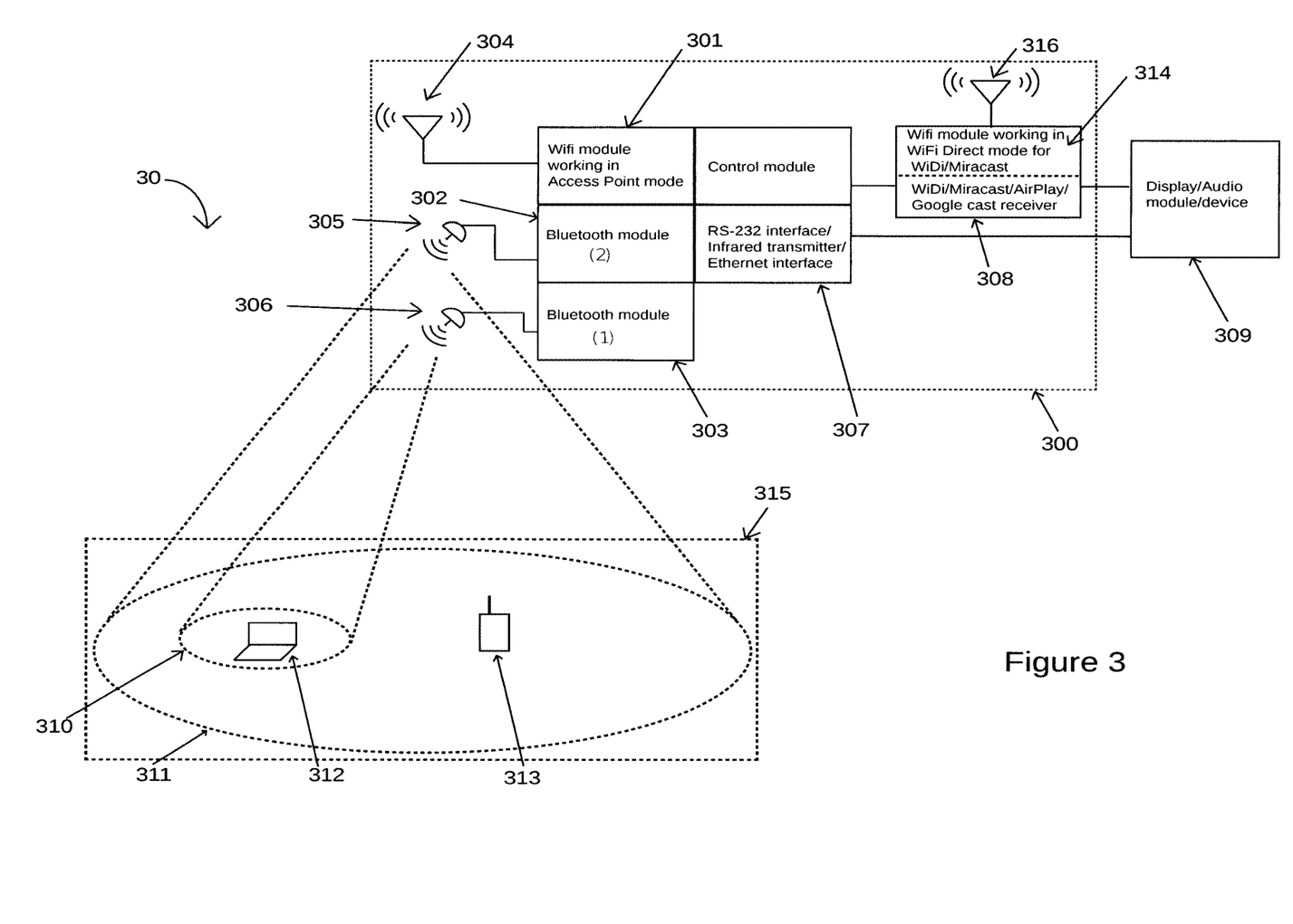
FIG. 3 is a schematic block diagram of one embodiment of a system implementing the method of this disclosure.

FIG. 3 illustrates a system comprising a receiver device 300 and a number of sender devices 312,313. The receiver device 300 comprises a wifi module 301 which is working in wireless Access Point (AP) mode, and a first Bluetooth module 303 connecting with directional antenna 306, and a second Bluetooth module 302 connecting with omnidirectional and/or directional antenna 305. The transmission power of both Bluetooth modules 302,303 is adjustable. The receiver device 300 further comprises the module 308, which is used to process the WiDi/Miracast/Apple AirPlay/Google cast protocols. The receiver device 300 further comprises the module 307, which may be e.g. a RS-232 interface, an infrared receiver/transmitter or an ethernet interface, through which it is possible for a user to remotely shut on/off an external display/audio device connected to the receiver device 300, as well as obtain the status of the external display/audio device, said status being for example the on/off status, the self check status, the projector lamp life status etc.

The wifi module 301, which is working in wireless Access Point mode, connects with the omnidirectional and/or directional antenna 304, and the wifi module 314 which is working in WiFi Direct mode for WiDi/Miracast connects with the omnidirectional and/or directional antenna 316. The radio signals from the antennas 304 and 316 can reach at least the sender devices present within the area 311 (i.e. the spatial coverage of said radio signals) at signal strengths sufficient for a sender device located in any region within said area 311 to successfully communicate with the receiver device 300 wirelessly. The Service Set Identifier (SSID) and/or access password of the wifi module 301 are/is different from time to time, for example it may be different every time the receiver device 300 is started. The SSID and access password are broadcasted by the Bluetooth modules 302 and 303 (or, alternatively, 302 only) through the Bluetooth device name (Bluetooth user friendly name) or the Bluetooth Low Energy advertising channel.

By adjusting the transmission power of the second Bluetooth module 302, the first spatial coverage 311 of the antenna 305 covers as large region as possible within the area 315, while minimizing signal leakage out of the area 315. The second Bluetooth module 302 broadcasts a setup signal comprising the SSID and access password of the wireless access point 301 through the Bluetooth device name (Bluetooth user friendly name) or the Bluetooth Low Energy advertising channel.

The first Bluetooth module 303 connects with the directional antenna 306. The direction of the directional antenna 306 as well as the transmission power of the first Bluetooth module 303 can be adjusted to make the second spatial coverage 310 of the antenna 306 cover a specific area within the area 311. Furthermore, the first spatial coverage 311 in the area 315 is larger than the second spatial coverage 310 in the area 315, wherein the first spatial coverage 311 is overlapping the second spatial coverage 310. The second spatial coverage 310 may be for instance the podium area in a classroom, or the area where a meeting moderator is sitting or standing in a meeting room. The first Bluetooth signal acts as a privilege signal and contains privilege credentials pertaining to the sender device receiving said privilege credentials to obtain a status, by the receiver device 300, as a privileged sender device. A string of text, which is regularly changed for a new string of text, is working as privilege credentials. Said string of text is included in the information broadcasted through the Bluetooth device name (Bluetooth user friendly name) or Bluetooth low energy advertising channel by the first Bluetooth module 303. Thus, said string of text is only possible to receive from within the second spatial coverage 310, which is defined by the spatial coverage of the first Bluetooth signal transmitted by the directional antenna 306.

By discovering the neighbourhood Bluetooth device or listening to the Bluetooth Low energy broadcasting channel, the sender devices 312 and 313 which has already received broadcast information from the second Bluetooth module 302, can get access to the wireless AP by using the SSID and password in the broadcast information, so that all of them could setup WiDi/Miracast/Apple AirPlay/Google cast connections with the receiver device 300 to stream their content on the display/audio module/device 309 via the wifi modules 304 or 314. The sender device 313, which is outside of the second spatial coverage 310 of the antenna 306, does not have privilege because it cannot receive the privilege credentials required. The sender device 312, which is located within the second spatial coverage 310 of the antenna 306, may receive the privilege credentials and will then, by the receiver device 300, be identified as a privileged sender device by the sender device 312 transmitting, to the receiver device 300, the privilege credentials (i.e. the string of text) it has received from reading the first Bluetooth signal. A sender device completely being within the second spatial coverage 310, will then, by the receiver device 300, be identified as a privileged sender device. A sender device moving within the first spatial coverage 311, while completely being outside the second spatial coverage 310, will, by the receiver device 300, be identified as an unprivileged sender device.

A privileged sender device can stream content to the display/audio module/device 309 via the wifi module 301 or 314, and further control the access of wireless data streaming from any unprivileged sender device. The access control comprises actions such as allow/disallow unprivileged sender devices to setup WiDi/Miracast/Apple AirPlay/Google Cast connections to the receiver device 300, cut an ongoing WiDi/Miracast/Apple AirPlay/Google Cast connection from any unprivileged sender device, and specify the next allowed sender device for streaming to the receiver device 300.

The receiver device 300 may further comprise one or more additional modules 307 such as e.g. an RS-232 interface, an infrared receiver/transmitter, an Ethernet interface, arranged to communicate with the external display/audio device. If an external display device, such as a projector or audio device 309, is connected to the receiver device 300 for displaying content, the user may then shut on/off the external display/audio device 309, or obtain the external device status from sender devices which communicate with the receiver device 300 via the wireless access point 301 when it is possible.

The receiver device 300 may further comprise an infrared-sensitive sensor adapted to continuously detect the presence of a human body in the room. The infrared sensitive sensor may then trigger the startup/wake-up of the rest of the modules of the receiver device 300 when a human is detected in the room. The infrared-sensitive sensor may further initiate shutdown and/or sleep mode of the receiver device 300 at occasions where the infrared-sensitive sensor does not detect a human in the room for a predefined period of time.

The receiver device 300 may further comprise a sound sensor adapted to continuously detect sound in the room. The sound sensor may then trigger the startup/wake-up of the rest of the modules of the receiver device 300 when sound is detected in the room. The sound sensor may further initiate shutdown and/or sleep mode of the receiver device 300 at occasions where the sound sensor does not detect sound in the room for a predefined period of time.

The advantage of using an infrared-sensitive sensor and/or a sound sensor as disclosed herein could be that it is convenient for the users of the receiver device 300, where an extra switch or remote controller is not needed, to startup/shutdown the receiver device 300. Furthermore, it is power efficient.

The receiver device 300 must not have to be a single unit mounted in the room, but could perform the same actions as one or more physically separate units connected via cables or by wireless connections. For example, the first Bluetooth module 303 and antenna 306 could be mounted separately on the teacher's desk and connecting with the rest of the modules of the receiver device 300 via cables or wireless connections. This may be advantageous as is makes it easier to accurately define the area 310 separating the privileged sender devices from the unprivileged sender devices.

Figure 4:
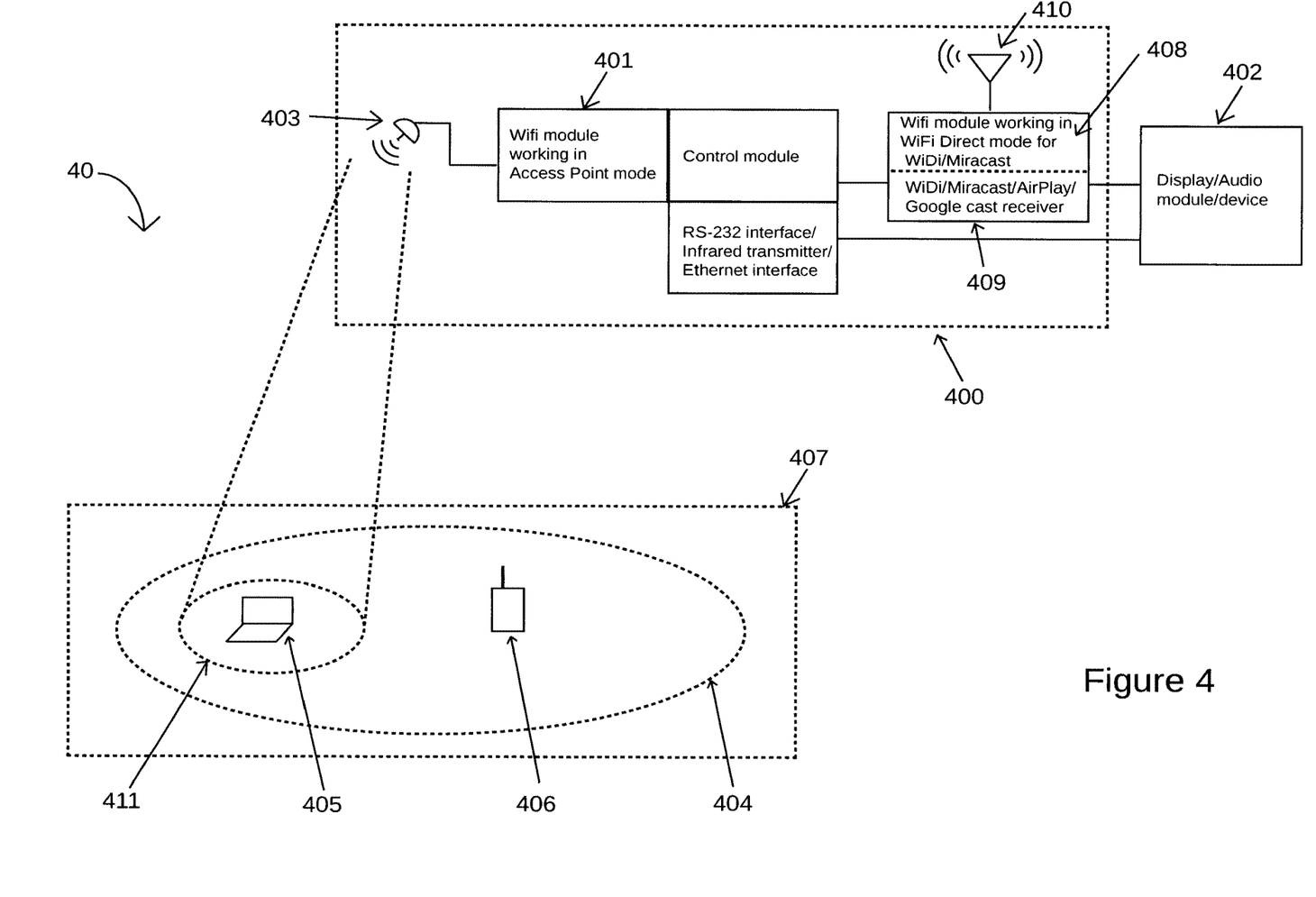
FIG. 4 is a schematic block diagram of another embodiment of a system implementing the method of this disclosure.

In an alternative embodiment of the present invention, the privileged sender device is identified in a different way as will be described with reference to FIG. 4. The receiver device 400 comprises a wifi module 401 working in wireless Access Point (AP) mode where the transmission power and/or receiving sensitivity of the wifi module 401 could be adjusted. This wifi module connects with the directional antenna 403. The direction of the directional antenna 403 and the transmission power and/or receiving sensitivity of the wifi module 401 may be adjusted to make the second spatial coverage 411 of the antenna 403 to cover a specific area within the area 404. The specific area can be for instance the podium area in the classroom, or the area where a meeting moderator is sitting or standing in a meeting room. The wifi module 408, which is working in WiFi Direct mode for WiDi/Miracast, connects with the omnidirectional and/or directional antenna 410. The radio signal from the antenna 410 has the first spatial coverage 404.

The SSID of the wifi module 401 is broadcasted and acts as the privilege signal. The sender device 405, present within the second spatial coverage 411 of the antenna 403, receives the SSID and then gets access to the wireless access point as a privileged sender device. Said sender device 405 can then stream content to the display/audio module/device 402 via wifi module 401 or 408, and further control the access of wireless data streaming from any unprivileged sender device 406. The access control comprises actions such as allow/disallow unprivileged sender devices to setup WiDi/Miracast/Apple AirPlay/Google Cast connections to the receiver device 400, cut an ongoing WiDi/Miracast/Apple AirPlay/Google Cast connection from any unprivileged sender device, and specify the next allowed sender device for streaming to the receiver device 400.

A sender device being completely within the second spatial coverage 411 is identified as a privileged sender device. The sender device 406, which is located outside of the second spatial coverage 411, while being within the first spatial coverage 404 of antenna 410, acts as an unprivileged sender device because it cannot receive the privilege signal. Said unprivileged sender device 406 could stream content to the display/audio module/device 402 though the wifi module 408. A sender device moving within the first spatial coverage 404, while completely being outside of the second spatial coverage 411, is identified as an unprivileged sender device. For AirPlay/Google cast, an unprivileged sender device, which does not get access into the wireless access point 401, cannot stream content to the receiver device 400 naturally.

In this scenario, the SSID and password of the wireless access point 401 could be made available, such as for instance written on the whiteboard in a class room or on paper hand-outs, for the user of a sender device to know which SSID they should connect to.

Figure 5:
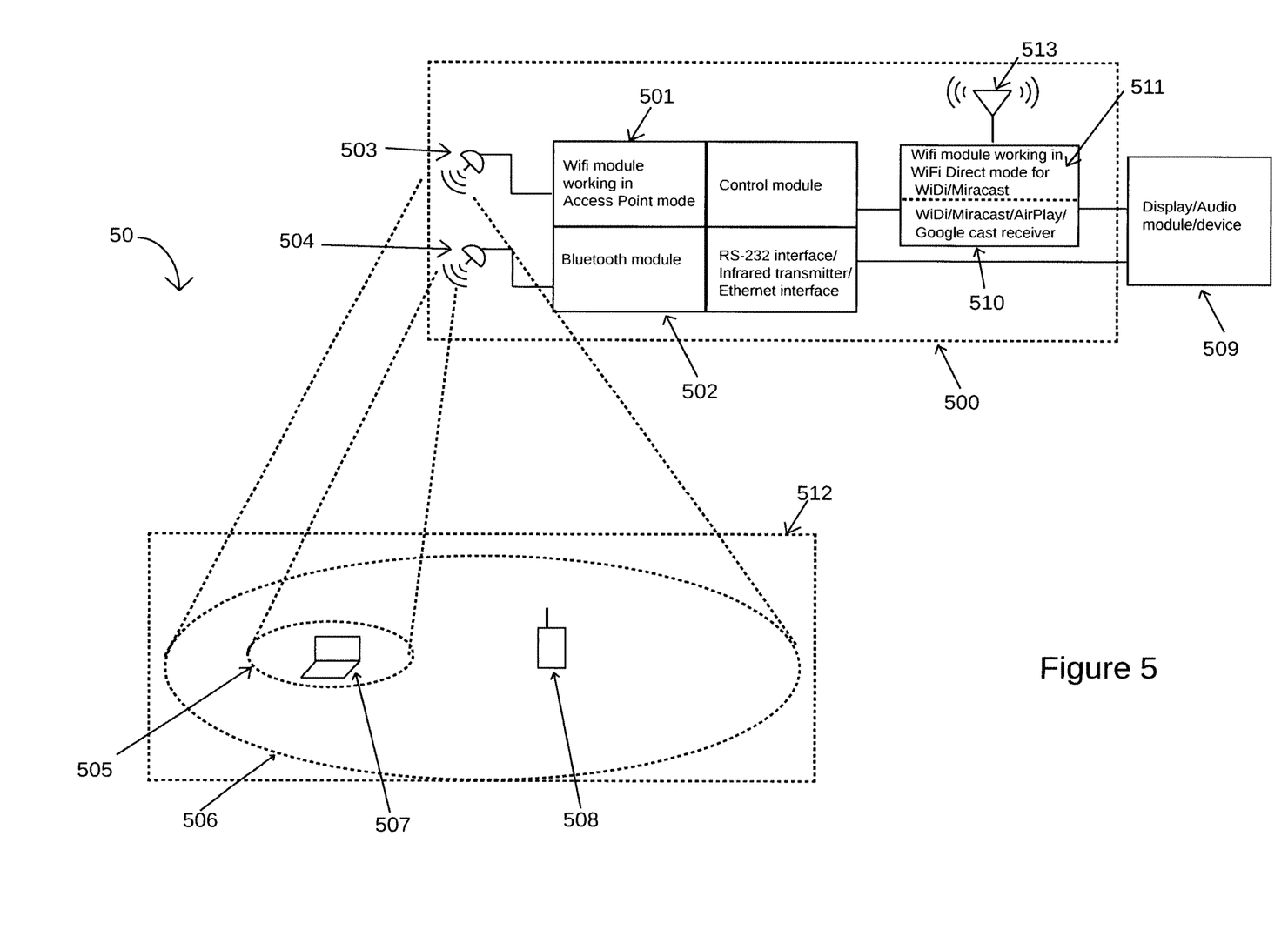
FIG. 5 is a schematic block diagram of yet another embodiment of a system implementing the method of this disclosure.

In an alternative embodiment of the present invention, the privileged sender device is identified in a different way as will be shown in FIG. 5. In this embodiment, the receiver device 500 comprises a wifi module 501 working in wireless Access Point mode (AP) where the transmission power and/or receiving sensitivity of the wifi module could be adjusted. The wifi module 501 connects with the omnidirectional and/or directional antenna 503. By adjusting the direction of antenna 503 and the transmission power and/or receiving sensitivity of the wifi module 501, the first spatial coverage 506 of the antenna 503 covers as large region as possible within the area 512, while minimizing signal leakage out of the area 512. Sender devices present within the first spatial coverage 506 can communicate with the wifi module 501. The wifi module 511, which is working in WiFi Direct mode for WiDi/Miracast, connects with the omnidirectional and/or directional antenna 513. The radio signal from the antenna 513 can reach the sender devices in the area 506.

The SSID and password of the wireless access point 501 could be publicly published somewhere, for the user of sender device in the area 506 to know which SSID they should connect to for streaming. Said sender devices 507, 508 have the possibility to stream the content to the display/audio module/device 509 via the wifi modules 501 or 511.

The receiver device 500 also comprises a Bluetooth module 502 that connects with the directional antenna 504. The direction and the transmission power of the Bluetooth module 502 could be adjusted to make the second spatial coverage 505 of the antenna 504 cover a specific area within the area 512. The second spatial coverage 505 can be for instance the podium area in the classroom, or the area where a meeting moderator is sitting or standing in a meeting room. A string of text, which is regularly changed for a new string of text, is working as privilege credentials, and is broadcasted through the Bluetooth device name (Bluetooth user friendly name) or Bluetooth low energy advertising channel by the Bluetooth module 502. The sender device 507, which is present within the second spatial coverage 505, will get the privilege by communicating the privilege credentials it receives from reading the Bluetooth signal from the directional antenna 504, to the receiver device 500. The sender device 508 will not receive the privilege credentials and hence act as an unprivileged sender device. A sender device being completely within the second spatial coverage 505, is identified as a privileged sender device; A sender device moving out of the second spatial coverage 505, while completely being within the first spatial coverage 506, is identified as an unprivileged sender device.

The embodiments herein are not limited to the above described examples. Various alternatives, modifications and equivalents may be used. For example, the privilege credentials may be transferred to the sender devices in other ways than a Bluetooth or Wifi signal, such e.g. infrared signals, NFC signals, or other types of electromagnetic radiation. Therefore, this disclosure should not be limited to the specific form set forth herein. This disclosure is limited only by the appended claims and other embodiments than the mentioned above are equally possible within the scope of the claims.

The devices (e.g. receiver device and sender device) and methods disclosed herein may be implemented as software, firmware, hardware or a combination thereof. In a hardware implementation, the division of tasks between functional units or components referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer.

The invention claimed is:

1. Method for access control of wireless data streaming to a receiver device, the method comprising the steps of:
   a) wirelessly connecting the receiver device to a plurality of sender devices positioned in an area, to obtain a wireless connection, wherein the positions of the plurality of sender devices having a first spatial coverage in the area,
   b) transmitting, by the receiver device, a privilege signal pertaining to a specific sender device of the plurality of sender devices to obtain a privileged status, the privilege signal having a second spatial coverage in the area
   c) extracting, by the specific sender device, privilege credentials from the privilege signal, and transmitting the privilege credentials from the specific sender device to the receiver device via the wireless connection to acquire privileged status of the specific sender device,
   d) controlling, by the specific sender device having a privileged status, access of wireless data streaming from any of the plurality of sender devices to the receiver device,
   wherein the first spatial coverage in the area is larger than the second spatial coverage in the area wherein the first spatial coverage is overlapping the second spatial coverage,
   and wherein a sender device having received the privilege signal and obtained a privileged status being a privileged sender device and a sender device having not received the privilege signal and not obtained a privileged status being an unprivileged sender device.

2. A method according to claim 1, wherein step a) comprises:
   a1) transmitting, by the receiver device, a setup signal pertaining to a sender device to connect to the receiver device, the setup signal having at least the first spatial coverage in the area,
   a2) extracting, by the plurality of sender devices, setup credentials from the setup signal, the setup credentials being used by each of the plurality of sender devices to establish the wireless connection to the receiver device.

3. A method according to claim 2, wherein the setup signal is a second Bluetooth signal.

4. A method according to claim 3, wherein the second Bluetooth signal uses one from the list of: Bluetooth device name, Bluetooth low energy advertising channel.

5. A method according to claim 2, wherein the privilege signal is a first Bluetooth signal.

6. A method according to claim 5, wherein the setup signal is a second Bluetooth signal.

7. A method according to claim 6, wherein the first and second Bluetooth signal uses one from the list of: Bluetooth device name, Bluetooth low energy advertising channel.

8. A method according to claim 2, wherein the setup credentials comprises:
   service set identifier (SSID) and
   access password,
   wherein the setup credentials are used to obtain access to the receiver device (300, 400, 500) via a wireless access point.

9. A method according to claim 8, wherein the service set identifier (SSID) and/or access password of the wireless access point is changed for a subsequent setup signal.

10. A method according to claim 1, wherein the wireless data streaming is intended for audiovisual purposes using at least one from the list of:
    Intel® WiDi
    Miracast
    Apple® Airplay
    Google® Cast.

11. A method according to claim 1, wherein the privilege signal is a first Bluetooth signal.

12. A method according to claim 1, wherein the wireless data streaming to the receiver device from a sender device is realised using at least one WiFi module, said at least one WiFi module being arranged to operate in one from the list of: wireless Access Point mode, WiFi Direct mode.

13. A method according to claim 1, wherein the privilege credentials are changed for a subsequent privilege message.

14. A method according to claim 1, wherein any privileged sender device performs one or more from:
    allowing any unprivileged sender device to stream data to the receiver device,
    disallowing any unprivileged sender device to stream data to the receiver device, interrupt ongoing data streaming from any unprivileged sender device to the receiver device.

15. A computer program product comprising a non-transitory computer readable storage medium with instructions adapted to carry out the method claim 1 when executed by a device having processing capability.

16. A receiver device being wirelessly connected to a plurality of sender devices positioned in an area, wherein the positions of the plurality of sender devices have a first spatial coverage in the area, the receiver device comprising:
   a transmitter unit arranged to wirelessly transmit a privilege signal pertaining to a specific sender device to obtain a privileged status, the privilege signal having a second spatial coverage in the area,
   at least one wireless circuitry arranged to establish connection with sender devices for streaming wireless data to the receiver device,
   wherein the first spatial coverage in the area is larger than the second spatial coverage in the area, wherein the first spatial coverage is overlapping the second spatial coverage,
   and wherein a sender device having received the privilege signal and obtained a privileged status being a privileged sender device and a sender device having not received the privilege signal and not obtained a privileged status being an unprivileged sender device,
   and wherein the receiver device is arranged to allow a specific sender device having a privileged status to control access of wireless data streaming from any of the plurality of sender devices to the receiver device.

17. The receiver device according to claim 16, wherein the receiver device further comprises:
   a second transmitter unit being arranged to wirelessly transmit a setup signal pertaining to a sender device to connect to the receiver device, the setup signal having at least the first spatial coverage.

18. A system comprising a receiver device and a plurality of sender devices, the receiver device being arranged for:
   wirelessly connecting the receiver device to a plurality of sender devices positioned in an area wherein the positions of the plurality of sender devices have a first spatial coverage in the area,
   transmitting a privilege signal pertaining to a specific sender device to obtain a privileged status, the privilege signal having a second spatial coverage in the area,
   wherein each of the plurality of sender devices being arranged for:
   extracting privilege credentials from the privilege signal, and transmitting the privilege credentials from each sender device of said plurality of sender devices to the receiver device via the wireless connection to acquire privileged status of the sender devices,
   controlling access of wireless data streaming from any of the plurality of sender devices to the receiver device,
   wherein the first spatial coverage in the area is larger than the second spatial coverage in the area, wherein the first spatial coverage is overlapping the second spatial coverage.

* * * * *